(No Model.)

C. H. DAVIDS.
PNEUMATIC TIRE.

No. 541,075.  Patented June 18, 1895.

Witnesses:—
George Barry,
N. B. Seward.

Inventor:—
Charles H. Davids
by attorneys
Brown & Seward

THE NORRIS PETERS CO., PHOTO-LITHO., WASHINGTON, D. C.

UNITED STATES PATENT OFFICE.

CHARLES H. DAVIDS, OF BROOKLYN, ASSIGNOR OF ONE-HALF TO JOHN STEWART, OF NEW YORK, N. Y.

PNEUMATIC TIRE.

SPECIFICATION forming part of Letters Patent No. 541,075, dated June 18, 1895.

Application filed August 25, 1894. Serial No. 521,279. (No model.)

*To all whom it may concern:*

Be it known that I, CHARLES H. DAVIDS, of Brooklyn, in the county of Kings and State of New York, have invented a new and useful Improvement in Pneumatic Tires for Vehicles, of which the following is a specification.

My invention relates, principally, to that class of pneumatic tires known as "single tube" tires which have no inner air tube; and the objects of my improvements are, first, to provide means for mechanically fastening such tires to wheel rims; second, to provide for access to the interiors of air chambers in pneumatic tires for the purpose of making repairs, and, third, to provide means for the automatic stoppage of leakage of air through joints or punctures in such tires, and by the same means, indicate the location of such leakage.

Figure 1:
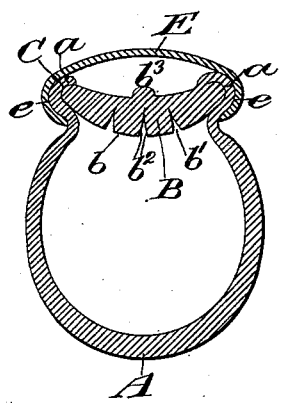
Figure 2:
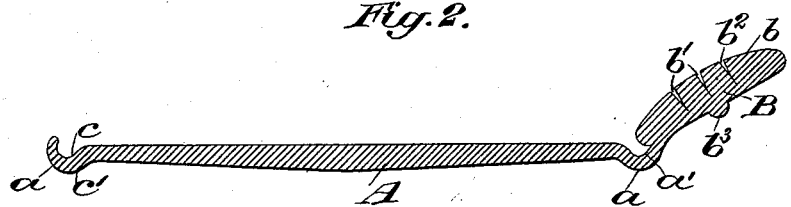
Figure 3:
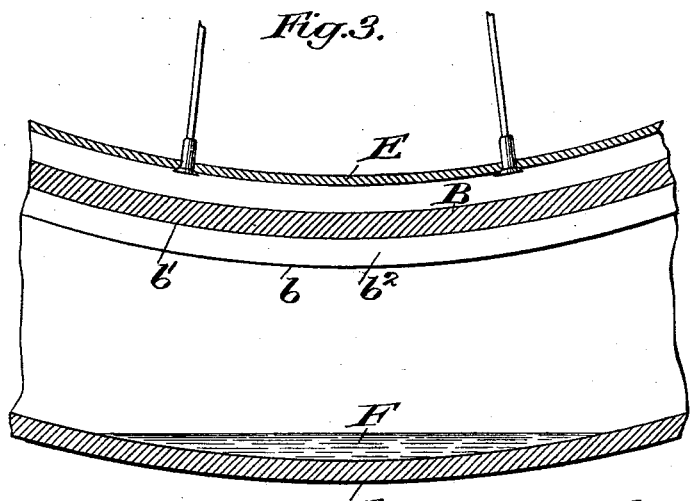

In the accompanying drawings, Figure 1 is a transverse section through the tire and rim, showing the parts assembled and tire inflated. Fig. 2 is a cross-section of the tire when opened, and Fig. 3 is a longitudinal vertical section of a tire containing liquid.

In the matter of fastening the tire to the wheel rim or felly, those parts of each which are in contact with parts of the other are practically identical in form and manner of use with corresponding parts of many well known tires and rims, viz: the edges of the rims have recesses into which fit the corners of the tires. Such arrangement of parts is, therefore, not broadly claimed.

In my improved tire, the sole or tread A, the corners $a, a$, and a lid B, all preferably joined in one piece, compose the whole of the tire; the latter having a seam or joint C in or adjacent to the lid B and extending throughout the inner circumference of the tire. The faces forming said joint are of such contour as will best insure an air tight closure when the joint C is closed. In the drawings the face $c$ is shown as concave and the face $c'$ as convex in cross section.

The lid B at its edge, opposite the joint C, is preferably attached to the tread A by a thin portion of flexible material which forms a hinge $a'$. The lid B may, however, if desired, be formed entirely separate from the tread A and two joints, like the one C shown, may be provided to hold the former in position in the latter. Moreover, where internal repairs will not be needed, the lid B formed as herein shown and described, may be permanently attached to the tread A at both of its edges.

The lid B or corners $a, a$ or all of these, should be, to some extent, both elastic and compressible, and of such relative proportions as to make the joint C air tight, and, also to hold the corners $a, a$ firmly engaged in the recesses, $e, e$ of the rim E when the tire is attached to the rim. The lid B should be somewhat wider from edge to edge than the space which it occupies in the tire when the latter is closed, and it should also be sufficiently flexible to permit its introduction, in a flexed form, between the corners $a, a$ when the latter are in their respective recesses $e, e$ and its resiliency should suffice to furnish the amount of compression requisite for the above mentioned purposes, when it has, as far as possible, resumed its original form after insertion, as aforesaid, between the corners $a, a$. In order to further insure its efficiency in this respect, it is deemed advisable to give the lid B an arched form in cross section, the extrados $b$ of the arch, being within the tire. Grooves $b'$ may be formed in the convex face of lid B and extend longitudinally along it and should be of such form preferably with convex sides $b^2$, that pressure on said convex face of the lid B will, by flattening the arch $b$, close the grooves $b'$ to an extent proportionate to said pressure and thus, by increasing the amount of material brought into resistance against such flattening, greater strength is assured for the purpose and likewise more intimate contact between the faces of the joint C and also between the corners $a, a$ and the rim.

It is quite evident that the lid B will press against the corners $a, a$ with considerable force, more especially when the tire is inflated. The joint C, if properly made, will thus, by compression, be made perfectly air tight, and the tire will be firmly attached to the rim by the engagement of the corners $a, a$ in the recesses $e, e$; but should there be leakage through the joint C, by reason of imperfect workmanship or defects in material, the faces of the joint C, or one of them, should be smeared or coated with dissolved caoutchouc or some other viscous substance, in order to make the joint C perfectly air tight; but the substance used for this purpose should not cause the faces of the joint to adhere with such tenacity as to prevent the opening of the joint C without injury to the tire.

A small quantity of harmless liquid F may be placed in the tire and clay, pulverized charcoal, or some other suitable substance may be mixed therewith, so as to remain mechanically suspended therein, or the density of the liquid may be increased by dissolving therein some substance not injurious to the material of which the tire is made. The objects of using this liquid thus prepared are, first, to prevent leakage through the joints or punctures in the tire, and, second, to indicate the location of such leaks as are not thus automatically stopped. The liquid F by seeping through leaks and depositing therein a portion of its dissolved or suspended matter, effectually closes such as are of minor extent; and by its appearance on the outer surface of the tire, indicates the exact location of leaks of a more serious nature.

A stop $b^3$ may be formed on the lid B, as shown, and by impinging against the rim will prevent the lid B from being forced beyond its point of greatest compression from whence, the pressure being removed, it would not automatically return to its original form and position.

All parts of the tire should be made of material which is sufficiently strong and impervious to withstand, without leakage, the pressure of air which it may be necessary to employ therein, and also sufficiently flexible for the purpose contemplated.

In operation, the corner $a$ near the joint C is placed in the corresponding recess $e$ in the rim E. The faces of the joints C are engaged and the remaining corner $a$ of the tire is forced into the remaining recess $e$, the lid B being flexed in the operation sufficiently to permit the placing of the parts as described. The liquid F, with its suspended or dissolved matter, being introduced into the tire, the latter is then inflated through a suitable valve, not shown. To disconnect the tire from the rim, all air pressure should first be removed from the tire, after which, by forcing it sidewise against the rim, it can readily be removed from the rim.

What I claim is—

1. A pneumatic tire, comprising a flexible tube adapted to engage a wheel rim and provided with a flexible arched lid, the extrados of the arch being within the tube, the said lid having longitudinal grooves along its convex portion and a stop along its concave portion for engaging the rim to prevent the lid being forced beyond its point of greatest compression, substantially as set forth.

2. The combination with a wheel rim provided with recesses for receiving a pneumatic tire, of a pneumatic tube having its corners adapted to engage the said recesses, the said corners having concave recesses therein and an arched lid secured to one of the corners of the tube and provided with rounded edges adapted to enter said concave recesses in the corners for forming an air tight closure, substantially as set forth.

CHAS. H. DAVIDS.

Witnesses:
FREDK. HAYNES,
GEORGE BARRY.